(12) United States Patent
Pedley et al.

(10) Patent No.: US 10,204,369 B2
(45) Date of Patent: Feb. 12, 2019

(54) HAND-HELD COMMUNICATIONS DEVICE FOR TRACKING PHYSICAL SHOPPING CART CONTENTS AND UPDATING SHOPPING LIST

(71) Applicant: Wal-Mart Stores, Inc., Bentonville, AR (US)

(72) Inventors: Douglas James Pedley, Portland, OR (US); Richard Neil Cancro, Bentonville, AR (US); Joel Bennett Acker, Jr., Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 589 days.

(21) Appl. No.: 14/849,035

(22) Filed: Sep. 9, 2015

(65) Prior Publication Data
US 2015/0379607 A1    Dec. 31, 2015

Related U.S. Application Data

(63) Continuation of application No. 13/753,413, filed on Jan. 29, 2013.

(51) Int. Cl.
*G06Q 30/00*    (2012.01)
*G06Q 30/06*    (2012.01)
*G06K 9/62*    (2006.01)
*H04N 7/18*    (2006.01)

(52) U.S. Cl.
CPC ....... *G06Q 30/0629* (2013.01); *G06K 9/6201* (2013.01); *G06Q 30/0633* (2013.01); *H04N 7/18* (2013.01)

(58) Field of Classification Search
CPC ............... G06Q 30/00; G06Q 30/0601; G06Q 30/0631; G06Q 30/0633; G06Q 30/0641
See application file for complete search history.

(56) References Cited

U.S. PATENT DOCUMENTS 6,963,851 B1 * 11/2005 Szabo ............. G06Q 30/02
                                                          186/56
7,979,309 B1 *  7/2011 Stevens .......... G06Q 10/087
                                                          705/26.8

(Continued)

OTHER PUBLICATIONS

Wu, Huaigu, and Yuri Natchetoi. "Mobile shopping assistant: integration of mobile applications and web services." Proceedings of the 16th international conference on World Wide Web. ACM, 2007. (Year: 2007).*

*Primary Examiner* — Christopher B Seibert
(74) *Attorney, Agent, or Firm* — Bryan Cave Leighton Paisner LLP (57) ABSTRACT

A computer-implemented process is described and includes employing a shopping list that is accessible on a hand-held communications device, the shopping list including desired items for purchasing from a retailer. The hand-held communications device is employed at the retailer to capture information associated with a selected product. The information associated with the selected product is compared with the desired items contained on the shopping list accessible to the hand-held communications device. Upon correlating the selected product with one of the desired items contained on the shopping list, the shopping list is updated to indicate the desired item has been acquired.

21 Claims, 5 Drawing Sheets

(56) References Cited

U.S. PATENT DOCUMENTS

| | | | |
|---|---|---|---|
| 2006/0178947 A1* | 8/2006 | Zsigmond | B07C 5/34 |
| | | | 705/26.1 |
| 2008/0195641 A1* | 8/2008 | Tischer | G06Q 30/04 |
| 2009/0088203 A1* | 4/2009 | Havens | G06K 7/10881 |
| | | | 455/556.1 |
| 2012/0190386 A1* | 7/2012 | Anderson | G01C 15/04 |
| | | | 455/456.3 |
| 2012/0303480 A1* | 11/2012 | Stone | G06Q 30/00 |
| | | | 705/26.8 |
| 2013/0262995 A1* | 10/2013 | Howell | G06Q 10/087 |
| | | | 715/273 |
| 2014/0067564 A1* | 3/2014 | Yuan | G06Q 30/0633 |
| | | | 705/16 |
| 2015/0029339 A1* | 1/2015 | Kobres | H04N 7/181 |
| | | | 348/150 |
| 2015/0294390 A1* | 10/2015 | Fan | G06Q 30/0605 |
| | | | 705/26.4 |

* cited by examiner

HAND-HELD COMMUNICATIONS DEVICE FOR TRACKING PHYSICAL SHOPPING CART CONTENTS AND UPDATING SHOPPING LIST

CROSS-REFERENCE TO RELATED APPLICATION

This application is a continuation of U.S. patent application Ser. No. 13/753,413, filed Jan. 29, 2013, the disclosure of which is hereby incorporated by reference in its entirety.

TECHNICAL FIELD

The present disclosure relates generally to a retail environment, and in particular, examples of the present disclosure are related to employing a hand-held communications device in a retail shopping environment.

BACKGROUND ART

Retail marketers offer goods for purchase by shoppers. Individual shoppers in a retail environment traverse aisles to peruse and select one or more items for purchase, which they may place in a shopping cart or otherwise convey to a checkout counter where the items are scanned or otherwise accounted for to determine a price. A shopper may generate a shopping list containing items they desire to purchase, and can be generally interested in verifying that they have successfully obtained those desired items by checking off those items on the shopping list.

BRIEF DESCRIPTION OF DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DESCRIPTION OF EMBODIMENTS

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

By way of introduction, it is appreciated that a shopper engaged in retail shopping wants to verify that desired items contained on a shopping list are obtained during a trip to a retailer.

A computer-implemented process is described and includes employing a shopping list that is accessible on a hand-held communications device, the shopping list including desired items for purchasing from a retailer. The hand-held communications device is employed at the retailer to capture information associated with a selected product. The information associated with the selected product is compared with the desired items contained on the shopping list accessible to the hand-held communications device. Upon correlating the selected product with one of the desired items contained on the shopping list, the shopping list is updated to indicate the desired item has been acquired.

Figure 1:
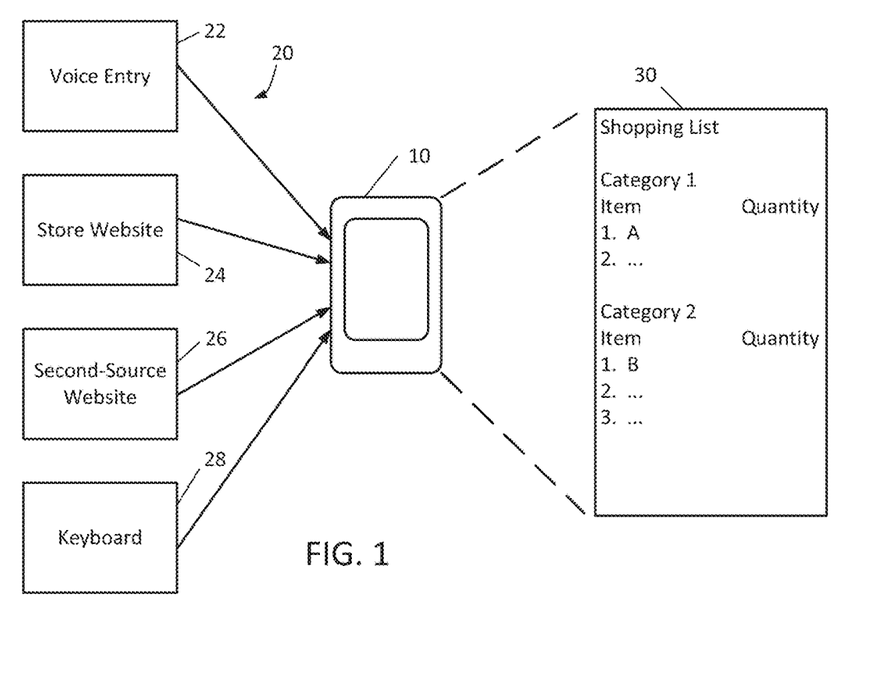
FIG. 1 schematically illustrates a hand-held communications device that is employed in generating a shopping list, according to some embodiments of the present disclosure.

To illustrate, FIG. 1 schematically shows a hand-held communications device 10 that is employed by an individual shopper in generating a shopping list 30. The shopping list 30 can be generated employing any suitable mechanism, including, e.g., an on-board list-generating application software program (List APP). The shopping list 30 may be a list of items (Item) that are desired to be purchased in the future, such as milk, eggs, flour, 2".times.4" boards, nails, snacks, ink cartridges, and others. The shopping list 30 may include details such as quantity(ies) of one or more desired items specified in terms of item, product brand, size, specific desired or undesired features, and other details. By way of a non-limiting example, when the desired item is milk, the item may be specified as a half-gallon of 2% non-BST milk bottled by We-be-cows Dairy in a refillable glass jar. The shopping list 30 may include multiple categories of goods (e.g., Category 1, Category 2), including by way of non-limiting examples, pasta goods, dairy goods, breads, cereals, paint, and others. The multiple categories may be preselected in the List APP, or user-generated, or otherwise determined. The shopping list 30 may further include details such as whether the individual shopper possesses a cost-saving coupon, rebate coupon, or other form for price reduction for a specific product or product brand. Examples may include, by way on non-limiting examples, coupons for specific cereals, or rebates for specific printer inks, or other price reductions.

The desired items appearing on the shopping list 30 may derive from one or more sources 20. The sources 20 for the desired items can be captured via one or more of the following, including a voice entry system 22 that is employed by the individual shopper, a store website 24 or a second-source website 26 that is visited by the individual shopper in search of goods, and from keyboard entry 28 of the hand-held communications device 10 by the individual shopper onto the shopping list 30. A store website or online service can permit a customer to create a registered account, for example, keyed to a phone number or email address, and the account can include streamlined tools for creating a shopping list, for example, including past shopping lists of the particular customer. One non-limiting example of a second-source website 26 includes a website that specializes in food recipes or construction projects, wherein the second-source website 26 may be employed to directly or indirectly populate the shopping list 30 with detailed information regarding one or more desired items. Desired items appearing on the shopping list 30 may also derive from other sources 20, including, e.g., a list generated on another hand-held communications device by an ancillary shopper that can be communicated to the hand-held communications device 10 prior to or during a shopping trip. It is appreciated that the aforementioned sources 20 are non-limiting, and that other sources may be employed with similar effect.

Figure 2:
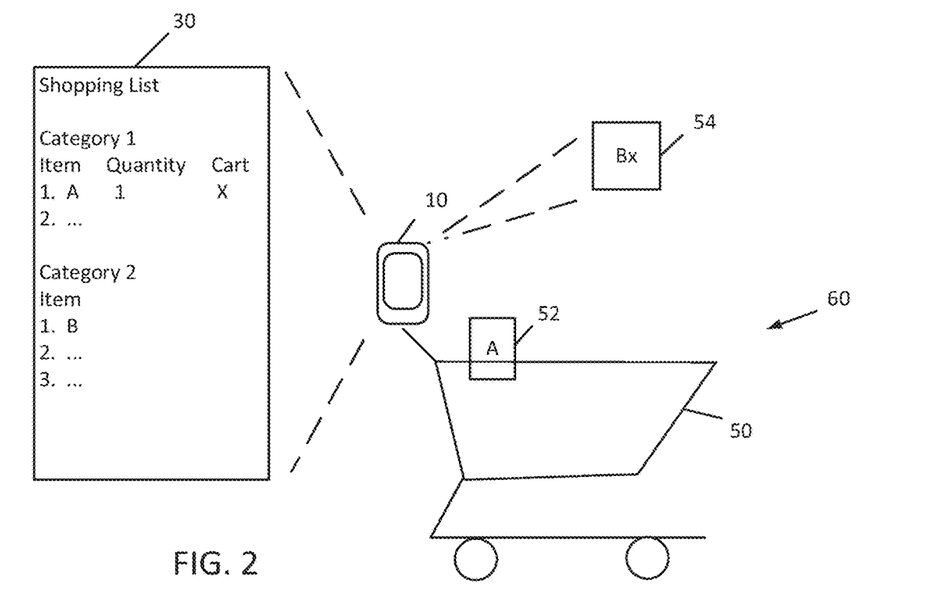
FIG. 2 schematically illustrates the hand-held communications device with shopping list in conjunction with a shopping cart employed by an individual shopper in a retail setting, according to some embodiments of the present disclosure.

FIG. 2 schematically shows the hand-held communications device 10 with shopping list 30 and a shopping cart 50 employed by an individual shopper in a retail setting 60. The hand-held communications device 10 is configured to capture and log information for a selected product, and is preferably equipped with a scanning device that can be employed to scan a universal product code (UPC) of the selected product. Preferably the hand-held communications device 10 includes a software application that is configured to scan a UPC, for example, as enabled by a camera device of the communications device and associated image recognition software, and determine a price and key information for the selected product. The List APP associated with the shopping list 30 is preferably configured to compare the key information for the selected product with the items on the shopping list 30 to correlate the selected product with one of the items on the shopping list 30 based upon correspondence between the key information for the selected product and the terms employed for the items on the shopping list 30. The shopping list 30 is updated to indicate that the item included on the shopping list 30 corresponding to the selected product has been acquired. The selected product is placed in the shopping cart 50 for purchase. By way of example, selected product A 52 in the shopping cart 50 corresponds to item A on the shopping list 30. Selected product Bx 54 is being scanned by the hand-held communications device 10, with its correlation to item B on the shopping list 30 presently indeterminate. Products A 52 and Bx 54 can be any goods available for purchase in the retail setting 60.

Figure 3:
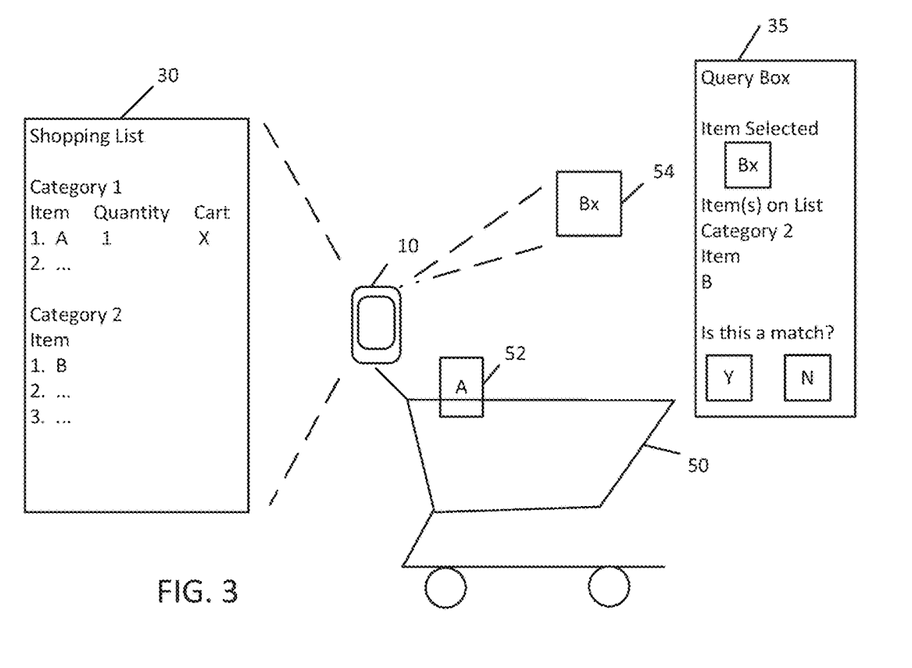
FIG. 3 schematically illustrates the hand-held communications device with shopping list and a query box employed by an individual shopper in a retail setting, according to some embodiments of the present disclosure.

FIG. 3 schematically shows the hand-held communications device 10 with shopping list 30 and a query box 35 employed by an individual shopper in a retail setting 60. The hand-held communications device 10 and query box 35 are employed to compare the captured information for a selected product with the items on the shopping list 30 to correlate the selected product with one of the items on the shopping list 30. One or more of the items on the shopping list 30 can be selected for comparison to the selected product by correlating the term(s) used to describe the item on the shopping list 30 with descriptive information corresponding to the captured information for the selected product. As shown, product A 52 has been selected, scanned and placed in the shopping cart 50 and has been correlated to item A on the shopping list 30, as indicated by placement of an 'x' beside item A under a column labeled "In Cart" on the shopping list 30 on the hand-held communications device 10. The process of updating the shopping list 30 to indicate that product A 52 matches item A on the shopping list 30 may occur automatically as a result of a one-to-one correlation between the information for product A 52 and item A on the shopping list 30 or a substantial correlation therebetween. Product Bx 54 is selected by the individual shopper and its UPC or other pertinent information is scanned by the hand-held communications device 10. The hand-held communications device 10 employs the query box 35, preferably implemented as a subroutine employed by the List APP, to search the items of the shopping list 30 in an attempt to correlate the selected product to one of the items on the shopping list 30. The query box 35 preferably depicts details of the selected product in the query box 35 along with one of the items on the shopping list 30. As shown, the query box 35 depicts selected product Bx 54 in the query box 55 along with one of the items (Item B) on the shopping list 30. The query box 35 poses a question to the individual shopper inquiring whether the selected product Bx 54 matches Item B on the shopping list 30 (MATCH?). The question posed is shown as a written statement on the touchscreen of the hand-held communications device 10, but other forms of querying the individual shopper may be employed, such as an auditory question delivered from an audio device of the hand-held communications device 10. The individual shopper responds with an affirmative answer (YES) or a negative answer (NO), with individual shopper responding by manually selecting one of the answers (YES/NO) on the touchscreen of the hand-held communications device 10. Alternatively, the individual shopper may respond using a verbal command that is recognizable to the hand-held communications device 10. When the answer to the inquiry is negative, i.e., there is not a match between the selected product and the depicted item from the shopping list 30, the query box 35 preferably presents another one of the items from the shopping list 30 and repeats the inquiry for the selected product. Alternatively, the individual shopper may provide a response that indicates the selected product is not on the shopping list 30. When the answer to the inquiry is positive, i.e., there is a match between the selected product and the depicted item from the shopping list 30, the query box 35 employs adaptive learning to correlate the selected product and the item from the shopping list 30 during subsequent shopping trips. When the shopping list 30 includes some form of price reduction through a promotional coupon, the shopping list 30 preferably includes a prompt on the screen of the hand-held communications device 10 to remind the individual shopper to proffer the coupon during checkout. In this manner, a shopper is able to employ a hand-held communications device that includes a shopping list that can be employed and automatically updated by checking off items on the shopping list that correlate to selected products during shopping at a retailer.

Figure 4:
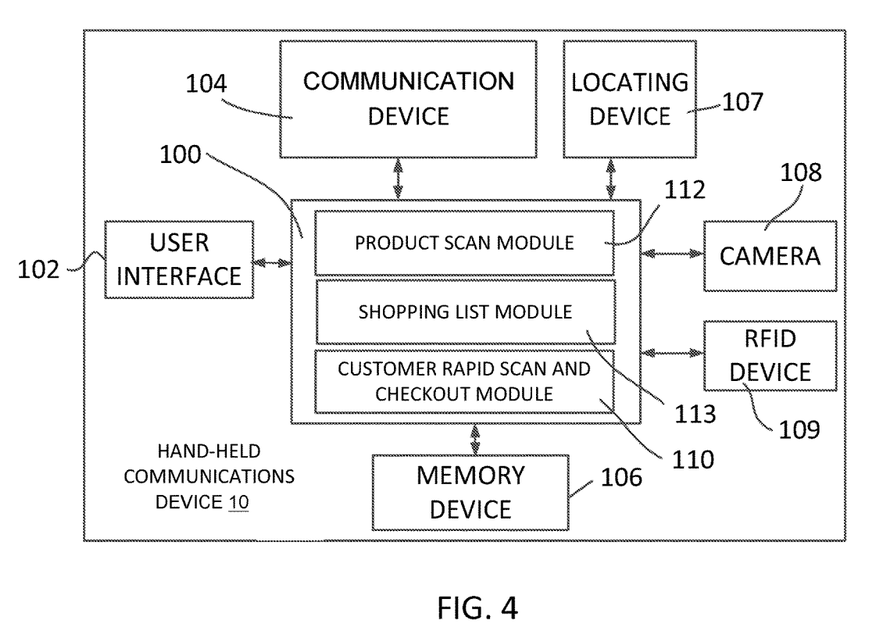
FIG. 4, a schematic illustrating exemplary components of a portable computerized device embodied as the hand-held communications device of FIG. 1, according to some embodiments of the present disclosure.

Referring now to FIG. 4, a schematic illustrating exemplary components of a portable computerized device embodied as the hand-held communications device of FIG. 1 is illustrated. In the illustrative embodiment, the hand-held communications device 10 includes a processing device 100, a user interface 102, communication device 104, a memory device 106, a locating device 107, a camera device 108, and a Radio Frequency Identification Device (RFID) 109. It is noted that the hand-held communications device 10 can include other components and some of the components are not always required. Hand-held communications device 10 can be operated as a customer operated purchasing device for use in a process to permit a customer to scan items to an electronic sales receipt list and proceed to a rapid checkout, as disclosed herein.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the hand-held communications device 10. In the illustrative embodiment, the processing device 100 also executes a customer rapid scan and checkout module 110 and a product scan module 112, and a shopping list module 113, which are described in greater detail below.

User interface 102 is a device that allows a user to interact with the hand-held communications device 10. While one user interface 102 is shown, the term "user interface" can include, but is not limited to, a touch screen, a physical keyboard, a mouse, a microphone, and/or a speaker.

The communication device 104 is a device that allows the hand-held communications device 10 to communicate with another device, e.g., a remote server, via a wireless or communications network. The communication device 104 can include one or more wireless transceivers for performing wireless communication and/or one or more communication ports for performing wired communication.

The memory device 106 is a device that stores data generated or received by the hand-held communications device 10. Memory device 106 can include, but is not limited to, a hard disc drive, an optical disc drive, and/or a flash memory drive.

The locating device 107 determines a location of the hand-held communications device 10 according to processes known in the art. According to one embodiment, locating device can include an RTLS device, for example, utilizing cell phone tower signals to triangulate or otherwise determine a location of the device.

The camera 108 is a digital camera that captures a digital photograph. Camera 108 receives an instruction to capture an image, captures an image of an object, i.e., a barcode of a product, and outputs the digital photograph. The digital photograph can be a bitmap, a JPEG, a GIF, or any other suitably formatted file. The camera 108 can receive the instruction to capture the image from the processing device 100 and can output the digital photograph to the processing device 100. As disclosed herein, an object can be scanned by the hand-held communications device in order indicate that the items is being purchased and that the item should be compared to the shopping list. Such scanning can include taking a photo of a barcode located on the product. In another embodiment, scanning can include simply holding the product in front of the camera device and while the camera device captures a series of images. Image recognition programming can be used to identify a product or barcode of a product from an image or series of images, with the barcode proximity to the camera device being used as an indication that the customer intends to purchase the item and add it to the shopping cart for purchase.

The Radio Frequency Identification Device (RFID) 109 can determine the location of the hand-held communications device 10 by triangulating positions by using Radio Frequency Identification Device (RFID) radio signals from small transmitters placed throughout a building in known locations. In another embodiment, RFID device 109 can determine proximity of the device to a mobile feature, such as a store clerk, or proximity to a temporary or one-time display not loaded into a store database.

The customer rapid scan and checkout module 110 includes programming enabling a user to walk through the store, scan items for purchase, put the items into the user's shopping cart or bag, and proceed through a rapid checkout process, wherein an virtual cart list including the products scanned and put into the cart or bag are used to provide for easy payment for the products purchased. Items scanned are tallied, and according to processes disclosed herein, the store provides the customer with an ability to pay for the goods and exit the store.

Product scan module 112 monitors data from a camera device and identifies a information related to a scanned product, so that the product can be purchased. Product scan module 112 can include image recognition software to identify object information such as a barcode or logo information, or product scan module 112 processes such images so that they can be processed in a remote server to identify the object information.

Shopping list module 113 monitors a shopping list, for example, as originally entered by the shopper. Module 113 can further permit the shopper user to enter the list or modify the list. Module 113 can further track and present changes to the shopping list, for example, as items are designated as fulfilled by the processes herein.

Embodiments in accordance with the present disclosure may be embodied as an apparatus, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

Figure 5:
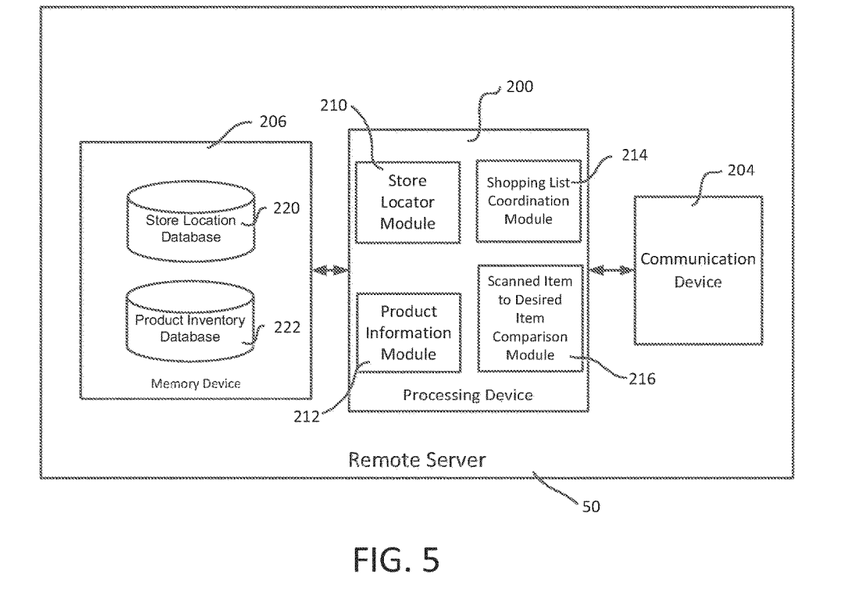
FIG. 5 is a schematic illustrating an exemplary remote server enabling processes disclosed herein, according to some embodiments of the present disclosure.

FIG. 5 is a schematic illustrating an exemplary remote server enabling processes disclosed herein. In the illustrated embodiment, the remote server 50 may include a processing device 200, a communication device 204, and a memory device 206.

The processing device 200 can include memory, e.g., read only memory (ROM) and random access memory (RAM), storing processor-executable instructions and one or more processors that execute the processor-executable instructions. In embodiments wherein the processing device 200 includes two or more processors, the processors can operate in a parallel or distributed manner. In the illustrative embodiment, the processing device 200 executes one or more of a store locator module 210, a product information module 212, a shopping list coordination module 214, and a scanned item to desired item comparison module 216.

The communication 204 is a device that allows the remote server 50 to communicate with another device, e.g., the hand-held communication device, via a network. The communication device 204 can include one or more wireless transceivers for performing wireless communication and/or one or more communication ports for performing wired communication.

The memory device 206 is a device that stores data generated or received by the remote server 50. The memory device 206 can include, but is not limited to a hard disc drive, an optical disc drive, and/or a flash memory drive.

Further, the memory device 206 may be distributed and located at multiple locations. The memory device 206 is accessible to the processing device 200. In some embodiments, the memory device 206 includes a store location database 220 and a product information database 222.

In some embodiments, the store location database 220 can store the store locations of one or more stores operated or associated with a retailer. The store location database 220 may be queried using a specific location, e.g., GPS coordinates, or a general location, e.g., postal zip code or city/state, and can return one or more stores that are proximate to the specific or general location. The store location database 220 may further be configured to store maps corresponding to each store location. The store location database 220 may be queried with a store location and can return the store map corresponding to the store location.

As discussed, the processing device 200 may execute the store locator module 210. The store locator module 210 receives a location from the portable computerized device and determines one or more store locations corresponding to the received location. In some embodiments, the store locator module 210 queries the store location database 220 with the received location and receives one or more store locations that correspond to the received location. For example, the store location database 220 may return any store locations that are within a predetermined distance, e.g., 10 miles, from the received location. When more than one store location is received, the store locator module 210 may automatically select the store location nearest to the received location or may provide the store locations to the portable computerized device, thereby allowing the portable computerized device or the user to select the store location.

The product information database 222 stores information about products in inventory of one or more stores. Database 222 interacts with product information module 212 such that queries regarding products including prices, barcode labels, logos present on packaging, and other information regarding different products can be accessed. Product information related to comparing a particular item in store inventory to a general classification or information from a shopper's list can be stored in database 222, for example, storing potential descriptions for a product. In one example, potato chips can include potential modifiers "chips," "salty snack," "party snack," "wheat free snack," "popular snack," etc. Product information database 222 can store and provide information specific to particular store locations as returned by store locator module 210.

The product information module 212 receives an object receives information from a customer scan of a barcode or other similar information and can query database 222 to determine details of a product associated with the customer scan. Such information can include a generic descriptors or modifiers of the product.

Shopping list coordination module 214 can coordinate a shopping list with shopping list module 113 (FIG. 4), for example, retrieving current information about items on the list from device 10. As items are scanned and identified, shopping list coordination module can provide the various items on the shopping list for comparison. Shopping list coordination module can further initiate an indication, for example, graphic, audio or other, to the customer that an item has been fulfilled.

Scanned item to desired item comparison module 216 includes programming to receive scanned items and any information available about the scanned item and compare the scanned item to information available from the shopping list of the customer. Wherein the shopping list contains specific items, for example, designated to a specific UPC number, module 216 can designate the item on the list as fulfilled as the particular barcode matching the item is scanned. Module 216 can be programmed to require specific matches. Module 216 can be programmed to return specific instructions to the customer if there is a close but not exact match to the shopping list, e.g. "Your Mom is asking for the 42 oz. container, not the 18 oz." Module 216 can be programmed to identify an item on the shopping list as fulfilled if a close item is scanned, for example, assuming that the shopper made an impromptu decision to substitute one item for another, e.g., a recipe entered for chicken tacos including a desired item of 16 oz. of raw chicken could be identified as fulfilled by the shopper scanning 16 oz. of round steak. As disclosed herein, a process within module 216 for comparing a scanned item to a desired item can include taking a particular scanned item and deciding whether it fits a generic description provided in the shopping list or prompting the user for feedback or confirmation. The process provided as an example in FIGS. 4 and 5 include a remote server comparing scanned items to a shopping list, but a similar process is envisioned wherein the comparison would take place in device 10, and the disclosure is not intended to be limited to the particular examples provided herein.

Portable computerized devices embodied as a hand-held communications device as disclosed herein can take a number of different embodiments. Such a device can include a smart phone, a tablet computer, a laptop computer, or glasses equipped to project images in a view of the user. Such a hand-held communications device can be owned by the store and permanently affixed to the shopping cart. Exemplary portable computerized devices are provided, but the disclosure is not intended to be limited to the provided examples.

Entries to a shopping list can be specific products in specific quantities. In other embodiments, entries can be more generic, leaving room for interpretation, e.g., "eggs," "healthy snacks for the kids," or "something to bring to the party." Such generic entries can be matched broadly with scanned items and, for example, a prompt provided to the shopper in the store whether a presently scanned item fulfills that requirement on the list. In another embodiment, as the shopping list is being filled out, specific items available in the particular store in which the shopping will occur can be offered for selection. Specific examples can be provided, or broad categories can first be offered with then more specific examples. For example, if "healthy snacks for the kids" is entered, the user can first be offered the following choice: fruits, vegetables, or boxed snacks. Upon the user selecting vegetables, then carrot sticks, celery, and radishes can be offered for selection. The program can utilize learning programs, such as machine learning algorithms known in the art, learning from a user's previous choices to streamline offered selections over time.

Similarly, a learning program such a machine learning algorithm can be used to efficiently match scanned items to desired items on the shopping list. In an exemplary decision, does oatmeal fulfill a desired item of breakfast cereal, the system can either ask directly whether the oatmeal fulfills the list item or can ask for feedback after the decision is made, and based upon iterations of operation of the system, oatmeal can automatically be treated as either fulfilling the breakfast cereal item or not fulfilling it. In an alternative embodiment, statistical analysis of many shoppers can be used to make efficient decisions, e.g., do most shoppers feel that oatmeal fulfills a breakfast cereal list entry.

The hand-held communications device, upon identifying that a desired item has been fulfilled, can provide feedback to the user of the device. For example, a graphic can be displayed upon the screen indicating that one of the desired items has been identified as fulfilled. In another embodiment, the device can generate a celebratory sound, for example, a selectable brief music clip.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A process of utilizing a computerized system for comparing an item scanned for purchase in a retail store to a plurality of desired items from a shopping list, the process comprising:

receiving, through a processing device, an image, captured by a camera, of each of one or more objects placed in at least one shopping cart by a user and to output image data representative of the image, the shopping cart comprising a cart and an electronics device, the cart comprising a basket mounted on wheels, the electronics device comprising (1) a user interface configured to interact with the user, (2) a communication device configured to transmit and receive data, (3) a locating device configured to determine a location of the cart and the camera, the processing device configured to control the user interface, the communication device, the locating device, and the camera, and a server communicatively connected to the communication device and comprising a shopping list coordination module and a scanned item to desired item comparison module;

monitoring, through the processing device, the image data from the camera;

identifying, through the processing device, information related to the one or more objects based on the image data, or processing the image data to transmit identification of the one or more objects via the communication device;

monitoring, through the processing device, a list of items entered by the user, wherein the shopping list comprises the list of the items;

receiving, through the processing device, input from the user to modify the list of the items;

tallying, through the processing device, a list of the one or more objects to provide information related to the one or more objects for a transaction with respect to the one or more objects;

receiving, through the scanned item to desired item comparison module and from the communication device, the list of the items;

receiving, through the scanned item to desired item comparison module, the identification of the one or more objects;

comparing, through the scanned item to desired item comparison module, the identification of the one or more objects to the items in the list of the items;

determining, through the scanned item to desired item comparison module, whether one of the items in the list of the items is fulfilled based in response to the comparing indicating that there is a match between one of the one or more objects and the one of the items in the list of the items;

providing, through the scanned item to desired item comparison module, an indication of the match to the communication device such that the indication is provided by the user interface to the user in response to the comparing indicating that the match exists; and providing, through the scanned item to desired item comparison module, another indication to the communication device to indicate that a first item of the items in the list of the items is fulfilled in response to another item in a same category as the first item of the items that is not an exact match between a first object of the one or more objects and the first item of the items in the list of the items.

2. The process of claim 1, wherein determining whether the one of the items in the list of the items is fulfilled further comprises determining that a universal product code of the one of the items in the list of the items matches the identification of the one of the one or more objects.

3. The process of claim 1, further comprising generating the list of the items through the user interface, the list of the items comprising the plurality of desired items for purchase.

4. The process of claim 1, wherein providing the another indication to the communication device to indicate that the first item of the items in the list of the items is fulfilled is further based upon one of (a) referencing statistical data regarding the historical results of the another item fulfilling the first item of the items, and (b) output from a learning program including analysis of historical decisions of a customer using the communication device.

5. The process of claim 1, wherein determining whether the one of the items in the list of the items is fulfilled comprises:
employing a query box, the query box depicting the one of the one or more objects and the one of the items in the list of the items on a screen of the communication device;
querying whether the one of the one or more objects matches the one of the items in the list of the items; and
determining whether the one of the one or more objects matches the one of the items in the list of the items based upon an answer to the query.

6. The process of claim 5, wherein querying whether the one of the one or more objects matches the one of the items comprises employing text on the screen of the communication device to query whether the one of the one or more objects matches the one of the items in the list of the items.

7. The process of claim 5, wherein querying whether the one of the one or more objects matches the one of the items comprises employing audio of the communication device to query whether the one of the one or more objects matches the one of the items in the list of the items.

8. The process of claim 1, further comprising generating the list of the items on the communication device.

9. The process of claim 8, wherein generating the list of the items on the communication device comprises generating the list of the items employing information from a second-source website.

10. The process of claim 8, wherein generating the list of the items on the communication device comprises generating the list of the items employing a keyboard entry of the communication device.

11. The process of claim 8, wherein generating the list of the items on the communication device comprises generating the list of the items employing a voice entry to the communication device.

12. The process of claim 1, further comprising:
generating the list of the items through a registered online account; and
downloading the list of the items to the communication device.

13. The process of claim 1, further comprising:
monitoring an entry to the list of the items; and
when the entry is a generic description of a group of the items, offering specific items available in the retail store for selection to the list of the items.

14. A system for comparing an item scanned for purchase in a retail store to a plurality of desired items from a shopping list, the system comprising:
at least one shopping cart, each of the at least one shopping cart comprising:
a cart comprising a basket mounted on wheels;
an electronics device, comprising:
a user interface configured to interact with a user;
a communication device configured to transmit and receive data;
a locating device configured to determine a location of the cart;
a camera configured to capture an image of each of one or more objects placed in the cart by the user and to output image data representative of the image; and
a processing device configured to control the user interface, the communication device, the locating device and the camera, the processing device also configured to perform operations comprising:
monitoring the image data from the camera;
identifying information related to the one or more objects based on the image data or processing the image data to transmit identification of the one or more objects via the communication device;
monitoring a list of items entered by the user, wherein the shopping list comprises the list of the items;
receiving input from the user to modify the list of the items; and
tallying a list of the one or more objects to provide information related to the one or more objects for a transaction with respect to the one or more objects; and
a server communicatively connected to the communication device of each of the at least one shopping cart, the server comprising:
a shopping list coordination module configured to receive, from the communication device, the list of the items; and
a scanned item to desired item comparison module configured to perform operations comprising:
receiving the identification of the one or more objects;
comparing the identification of the one or more objects to the items in the list of the items;
determining whether one of the items in the list of the items is fulfilled based on response to the comparing indicating that a match exists between one of the one or more objects and the one of the items in the list of the items;
providing an indication of the match to the communication device such that the indication is provided by the user interface to the user in response to the comparing indicating that the match exists; and
providing another indication to the communication device to indicate that a first item of the items in the list of the items is fulfilled in response to another item in a same category as the first item of the items that is not an exact match between a first object of the one or more objects and the first item of the items in the list of the items.

15. The system of claim 14, wherein determining whether the one of the items in the list of the items is fulfilled further comprises determining that a universal product code of the one of the items matches the identification of the one of the one or more objects.

16. The system of claim 14, wherein determining whether the one of the items in the list of the items is fulfilled further comprises determining, through the processing device, that the one of the one or more objects includes a stored descriptor that matches a generic description of the one of the items in the list of the items.

17. The system of claim 14, wherein the processing device is further configured to perform operations comprising:
monitoring an entry to the list of the items; and
in response to the entry including a generic description of a group of the items, providing, via the user interface, an indication that one or more specific objects are available in a proximity of the user based at least in part on the location of the cart, the one or more specific objects fitting the generic description.

18. The system of claim 14, wherein the processing device is further configured to perform operations comprising:

displaying, via the user interface, an image of the one of the one or more objects and the one of the items in the list of the items;

querying the user, via the user interface, whether the one of the one or more objects matches the one of the items in the list of the items; and receiving, via the user interface, a response from the user to determine whether the one of the one or more objects matches the one of the items in the list of the items.

19. The system of claim 18, wherein querying comprises presenting a textual query, an audible query, or both.

20. The system of claim 14, wherein the server is further configured to provide an instruction to the communication device for display to the user by the user interface, the instruction indicating that there is the another item in the same category as the first item of the items that is not the exact match between the first object of the one or more objects and the first item of the items in the list of the items.

21. The system of claim 14, wherein the determining whether the one of the items in the list of the items is fulfilled comprises (a) referencing statistical data regarding historical results of the another item fulfilling the first item of the items in the list of the items, (b) using output from a learning program including analysis of historical decisions of the user, or (c) both.

* * * * *